(12) United States Patent
Siegler

(10) Patent No.: US 10,410,302 B1
(45) Date of Patent: Sep. 10, 2019

(54) SYSTEMS AND METHODS FOR CONNECTING BUYERS TO AGENTS

(71) Applicant: CURB CALL, INC., Boston, MA (US)

(72) Inventor: Seth Siegler, San Diego, CA (US)

(73) Assignee: CONNECT NOW, INC., Boston, MA (US)

( * ) Notice: Subject to any disclaimer, the term of this patent is extended or adjusted under 35 U.S.C. 154(b) by 721 days.

(21) Appl. No.: 14/696,455

(22) Filed: Apr. 26, 2015

Related U.S. Application Data

(60) Provisional application No. 61/986,791, filed on Apr. 30, 2014.

(51) Int. Cl.
*G06Q 50/16* (2012.01)
*G06Q 10/06* (2012.01)
*H04W 4/02* (2018.01)

(52) U.S. Cl.
CPC ..... *G06Q 50/16* (2013.01); *G06Q 10/063114* (2013.01); *H04W 4/025* (2013.01)

(58) Field of Classification Search
CPC ......... G06Q 10/00; G05Q 40/06; G06F 17/60
USPC .............................................. 705/7.13, 7.15
See application file for complete search history.

(56) References Cited

U.S. PATENT DOCUMENTS

| | | | | |
|---|---|---|---|---|
| 2004/0199402 A1* | 10/2004 | Walker | ................... | G06Q 30/02 705/313 |
| 2005/0154656 A1* | 7/2005 | Kim | ....................... | G06Q 10/02 705/30 |
| 2005/0288959 A1* | 12/2005 | Eraker | ................... | G06Q 30/00 705/1.1 |
| 2006/0026032 A1* | 2/2006 | Higgins | ................. | G06Q 30/02 705/316 |
| 2006/0190285 A1* | 8/2006 | Harris | .................... | G06Q 30/02 705/1.1 |
| 2006/0218005 A1* | 9/2006 | Villena | ................... | G06Q 30/02 705/306 |
| 2008/0120161 A1* | 5/2008 | Saavedra | ............... | G06Q 30/08 705/313 |
| 2009/0048938 A1* | 2/2009 | Dupray | .................. | G06Q 30/02 705/27.1 |
| 2010/0036750 A1* | 2/2010 | Whelan | ............ | G06F 17/30241 705/26.1 |
| 2010/0063829 A1* | 3/2010 | Dupray | .............. | G06Q 30/0603 705/313 |
| 2013/0304657 A1* | 11/2013 | Miller | .................... | G06Q 50/16 705/313 |
| 2014/0122299 A1* | 5/2014 | Klein | ..................... | G06Q 50/16 705/26.62 |

(Continued)

OTHER PUBLICATIONS

Meagher, David, "Closest House for Sale—Geolocation Mobile "App" for Real Estate," Sep. 22, 2010, available at http://techsavvyagent.com/mobile-apps/closest-house-for-sale-geolocation-mobile-app-for-real-estate, 2010.*

*Primary Examiner* — Romain Jeanty
(74) *Attorney, Agent, or Firm* — Lando & Anastasi, LLP

(57) ABSTRACT

Methods, systems, means and machine-readable media embodying program instructions for connecting nearby real estate agents with potential buyers are described. Certain methods allow buyers to identify a real estate property while traveling around a neighborhood, generate a request to view the property, and then select an agent from among other agents to meet at the property before the buyer exits the neighborhood.

19 Claims, 5 Drawing Sheets

(56) References Cited

U.S. PATENT DOCUMENTS

| | | | |
|---|---|---|---|
| 2014/0129456 A1* | 5/2014 | Rao | G06Q 10/10 |
| | | | 705/313 |
| 2014/0278827 A1* | 9/2014 | Trailer | G06Q 50/16 |
| | | | 705/7.39 |
| 2014/0279590 A1* | 9/2014 | Trailer | G06Q 50/16 |
| | | | 705/313 |
| 2014/0279591 A1* | 9/2014 | Trailer | G06Q 50/16 |
| | | | 705/313 |
| 2015/0120352 A1* | 4/2015 | Steel | G06Q 30/0278 |
| | | | 705/7.14 |
| 2015/0127488 A1* | 5/2015 | Cutler | G06Q 30/0617 |
| | | | 705/26.43 |
| 2015/0235332 A1 | 8/2015 | Styve et al. | |

* cited by examiner

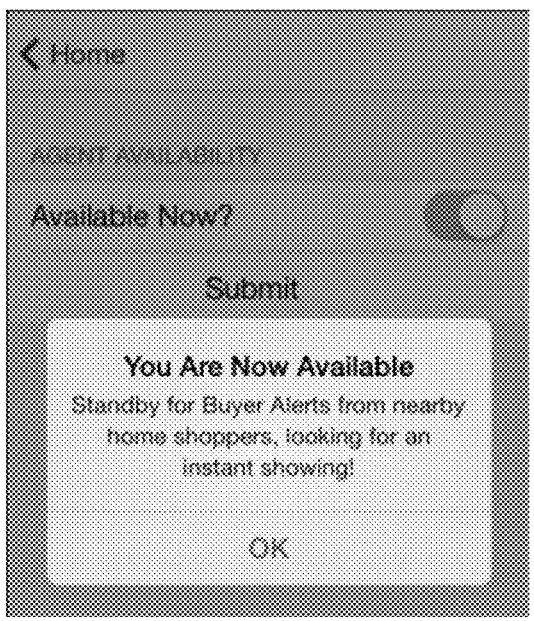
FIG. 5A
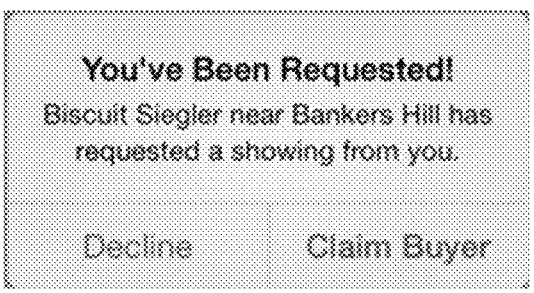
FIG. 5B
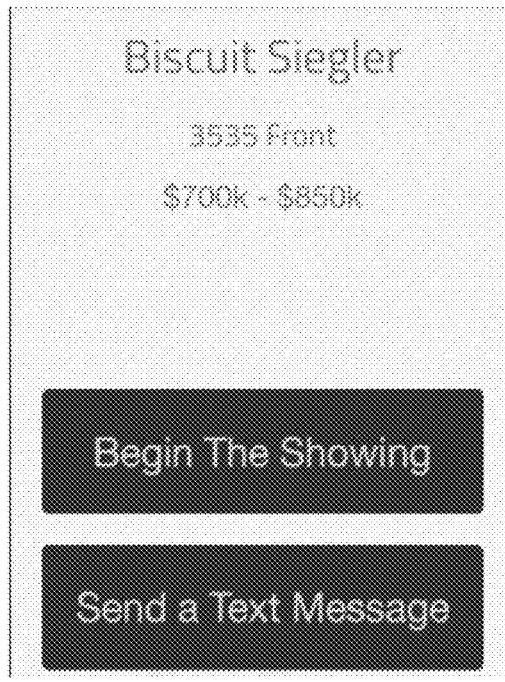
FIG. 5C
FIG. 5D
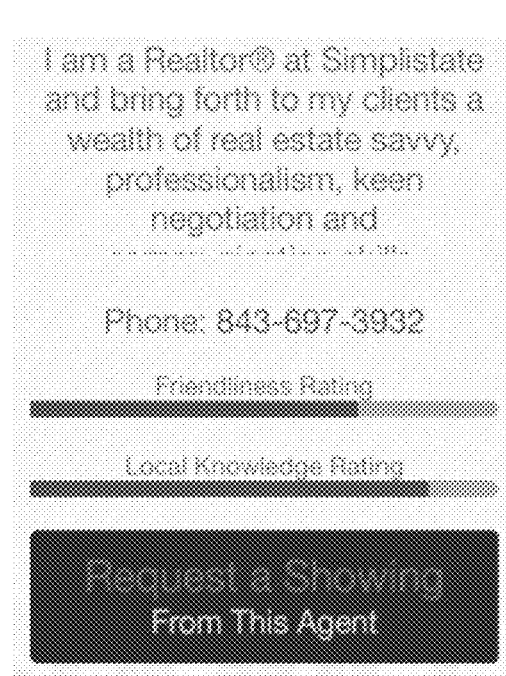
FIG. 5E
FIG. 5F

SYSTEMS AND METHODS FOR CONNECTING BUYERS TO AGENTS

RELATED APPLICATIONS

This application claims priority to U.S. Patent Application Ser. No. 61/986,791 filed Apr. 30, 2014, entitled SYSTEMS AND METHODS FOR CONNECTING BUYERS TO AGENTS, the content of which is hereby incorporated by reference herein in its entirety.

FIELD

Various embodiments relate to marketing and locating real estate property, and more particularly, to networks, devices, methods and machine-readable media for connecting potential buyers to available and nearby real estate agents, as well as real estate agents with particular qualities and ratings.

BACKGROUND

Previous methods of finding and engaging a real estate agent leave home buyers without a way to find a real estate agent with local knowledge, proximity and current availability. Once standing outside of a listing of interest, buyers can call an agent who is listing the house for sale, typically from the phone number on the yard sign, but this method offers no guarantee of that agent having knowledge of the local neighborhood or being availability for a showing.

Other methods of engaging a real estate, including responses to industry advertising in newspapers, billboards, bus benches, paid placements on websites or online search portals, offer no insight at all into current availability, feedback from previous clients and previous experience with the local neighborhood.

SUMMARY

Certain embodiments of this disclosure relate generally to networks, devices, methods and machine-readable media for connecting nearby real estate agents with potential buyers, as well as real estate agents with particular qualities and ratings. Such networks, devices, methods and machine-readable media may: identify a set of available agents from a plurality of agents; identify a location of each available agent; identify a buyer's request to view a real estate property; identify a location of the property; and transmit information corresponding to one or more available agents to the buyer.

DRAWINGS

FIG. 5A, FIG. 5B, FIG. 5C, FIG. 5D, FIG. 5E and FIG. 5F each illustrate a user interface of a computer application for connecting nearby real estate agents with potential buyers in accordance with aspects of the disclosure.

DESCRIPTION

Aspects of this disclosure generally allow prospective buyers (referred to herein as "buyers") to identify real estate property while traveling around a neighborhood, make a request to view the property while in the neighborhood, and then select a nearby agent (from among other agents) to meet at the property so that the buyer does not need to return to the neighborhood at a later time.

Figure 1A:
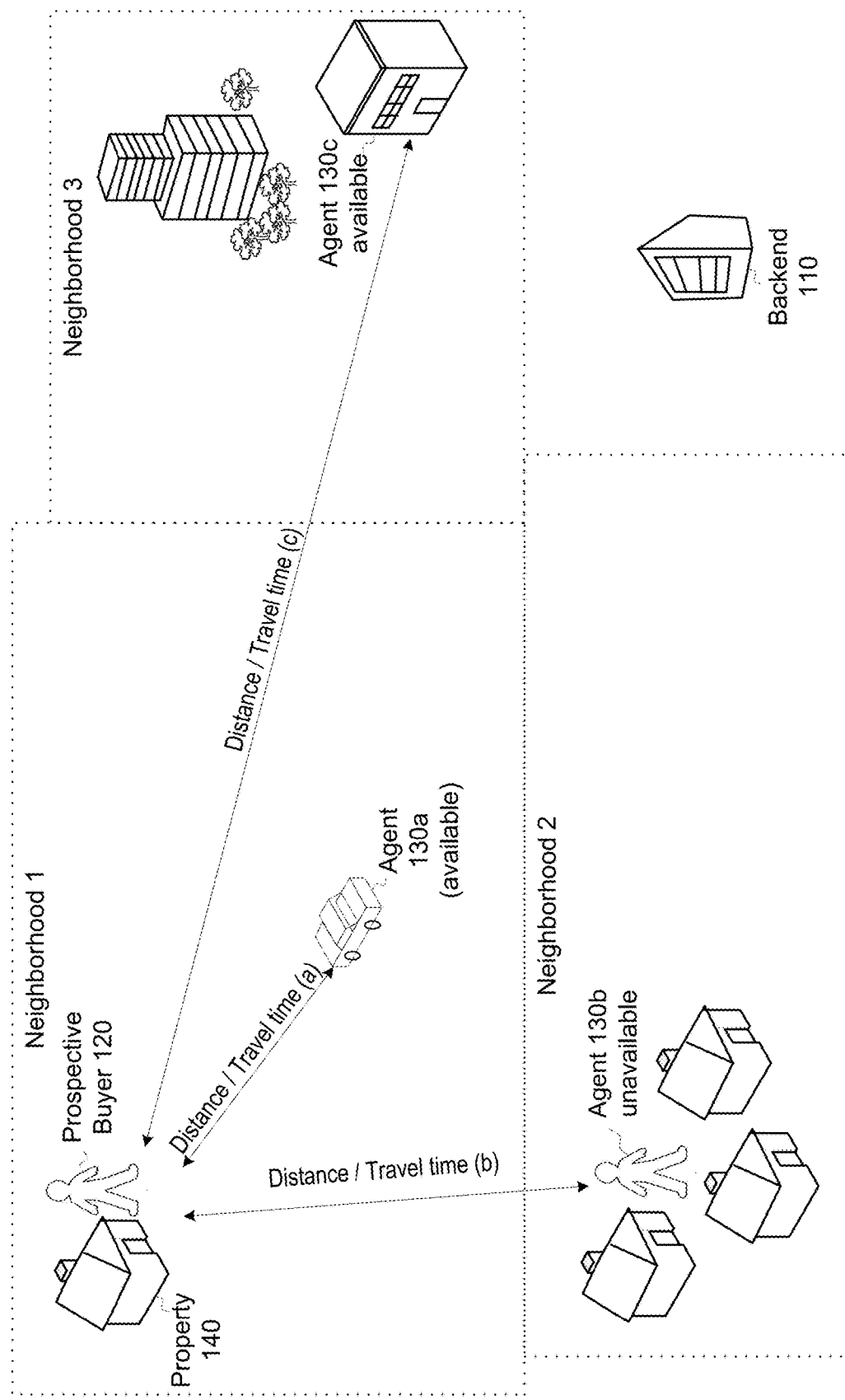
FIG. 1A shows an environment within which aspects of the disclosure may operate.

FIG. 1A shows an environment within which aspects of the disclosure may operate. The environment includes neighborhoods within which buyers, real estate agents, and properties are located. A buyer 120 may locate a property 140, and then generate a request to meet with one of the agents 130a-c at the property. The request may be processed at a backend system 110 that is located anywhere. The backend system 110 may qualify certain agents, and then provide a list of only those qualified agents to the buyer 120. For example, qualified agents may include only those agents that are available, only those agents that are within a tolerated distance or travel time from the property 140, and/or only those agents that offer their services in that neighborhood, for that type of property, for the property's listing price, or other characteristics of the property. Upon receiving a list of qualified agents, the buyer 120 may then select an agent (e.g., agent 130a). After selection, the buyer 120 and the selected agent 130a may contact each other using contact information received from the backend system 110.

The above process, in addition to other methods disclosed herein, enable a buyer to develop an interest in a property, and then efficiently and conveniently skip the process of making an appointment to view the property in advance of arriving at a property. Such a buyer may simply stop at a property, and then arrange a viewing of the property within minutes of stopping at the property.

The above process, in addition to other methods disclosed herein, also protects an agent's time such that an agent only travels to a property of interest to the buyer after the buyer has visited the property in person (versus online).

Overview of Systems

Figure 1B:
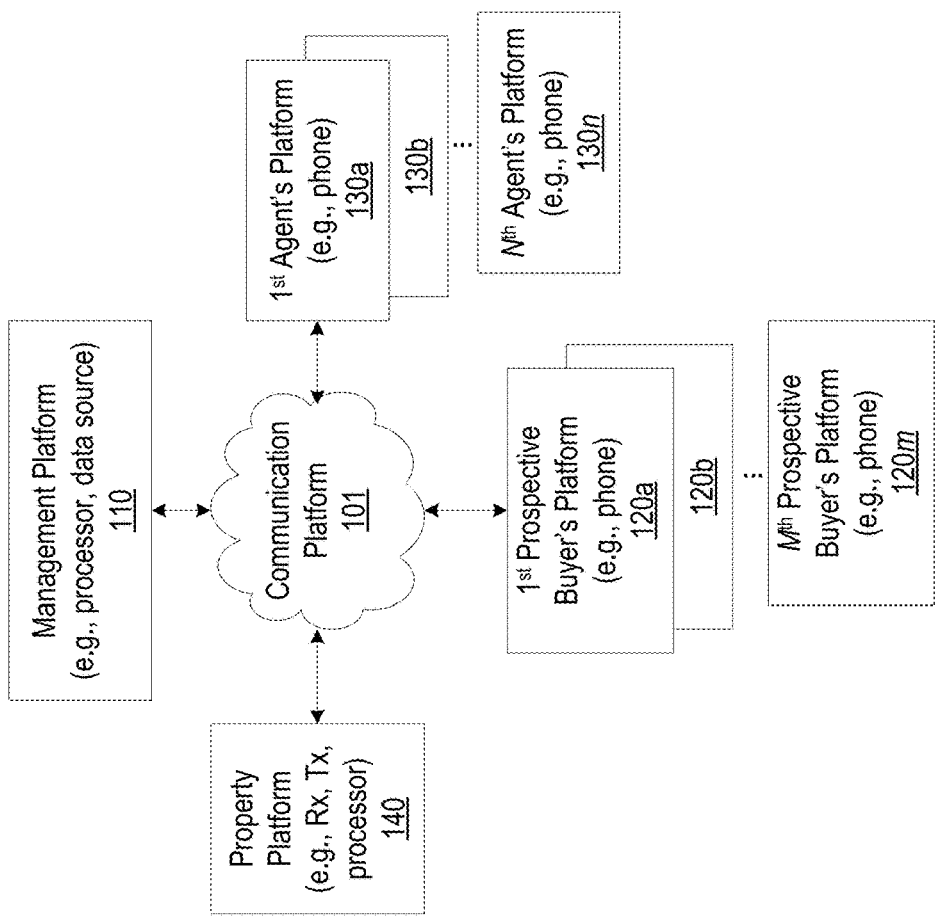
FIG. 1B depicts a network system within which aspects of the disclosure may operate.

FIG. 1B depicts a network system within which aspects of the disclosure may operate. As shown, the network includes a communication platform 101, a management platform 110, a buyer platform 120, an agent platform 130, and a property platform 140. The term "platform" as used herein may refer to a single component, a device with multiple components, or a grouping of components or devices at the same or different locations. A platform may include components or devices that may be hosted by parties other than those directly associated with the labeling of each platform. A platform may further include hardware, software, firmware or other components that receive, process and send data. Illustrative aspects of the platforms are described in more detail below.

Communication Platform 101

The communication platform 101 utilizes any known or later-developed communication technologies to facilitate communication among the various other platforms. Examples of communication technologies include any wired and/or wireless communication pathways, protocols and infrastructure (e.g., access points, gateways, and the like).

Management Platform 110

Figure 2:
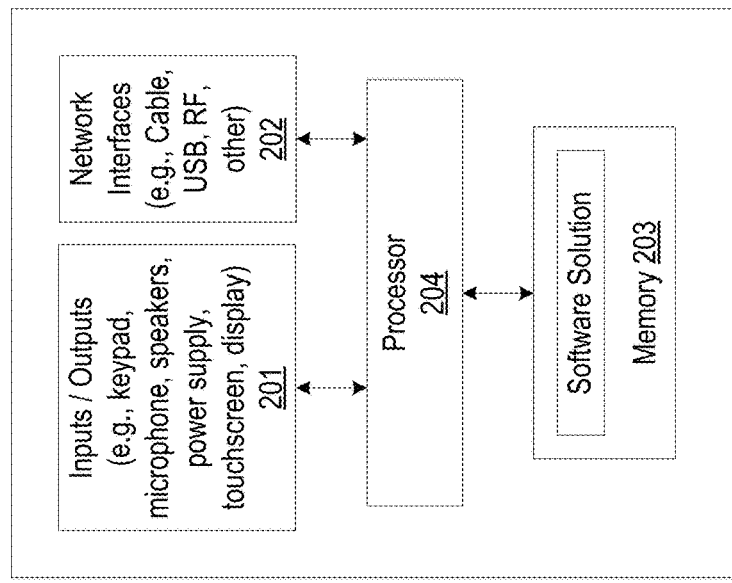
FIG. 2 depicts a device system within which aspects of the disclosure may operate.

The management platform 110 of FIG. 1B may include various components, including some or all of the components in FIG. 2, which depicts input/output interface(s) 201, network interface(s) 202, memory 203 and processor(s) 204. The management platform 110 may further include a software solution depicted in FIG. 2, such that the processor 204 executes instructions embodied in the software solution.

Buyer Platform 120

The buyer platform 120 may include any suitable computing device that allows a buyer to interact with other platforms or perform tasks at the buyer platform 120. For example, the buyer platform 120 may include personal computers, hand-held or laptop devices, mobile phones, tablets, e-readers, and programmable consumer electronics. The buyer platform 120 may include various components, including those depicted in FIG. 2. The buyer platform 120 may also include software applications, including those that operate with and without web connectivity.

The buyer platform 120 may further include a transmitter for broadcasting a signal (e.g., a short range signal) to the property platform 140, or a receiver for receiving a signal from the property platform 140. The buyer platform 140 may further include a suitable software solution that controls the transmitter or receiver, and that communicates information relating to the transmitted or received signals to the management platform 110. The signals may include various types of information, including identifiers associated with the buyer platform 120 (e.g., an identifier of the buyer platform 120 or the buyer) or the property platform 140 (e.g., an identifier of the property platform 140 or the property). The signals may further include other information about those platforms.

Agent Platform 130

The agent platform 130 may include any suitable computing device that allows an agent to interact with other platforms or perform tasks at the agent platform 130. For example, the agent platform 130 may include personal computers, hand-held or laptop devices, mobile phones, tablets, e-readers, and programmable consumer electronics. The agent platform 130 may include various components, including those depicted in FIG. 2. The agent platform 130 may also include software applications, including those that operate with and without web connectivity.

Property Platform 140

The property platform 140 may include some or all of the components in FIG. 2, and may additionally include a transmitter for broadcasting a signal to the buyer platform 120, or a receiver for receiving a signal from the buyer platform 120. The property platform 140 may further include a suitable software solution that controls the transmitter or receiver, and that communicates information relating to the transmitted or received signals to the management platform 110.

Overview of Methods

Figure 3:
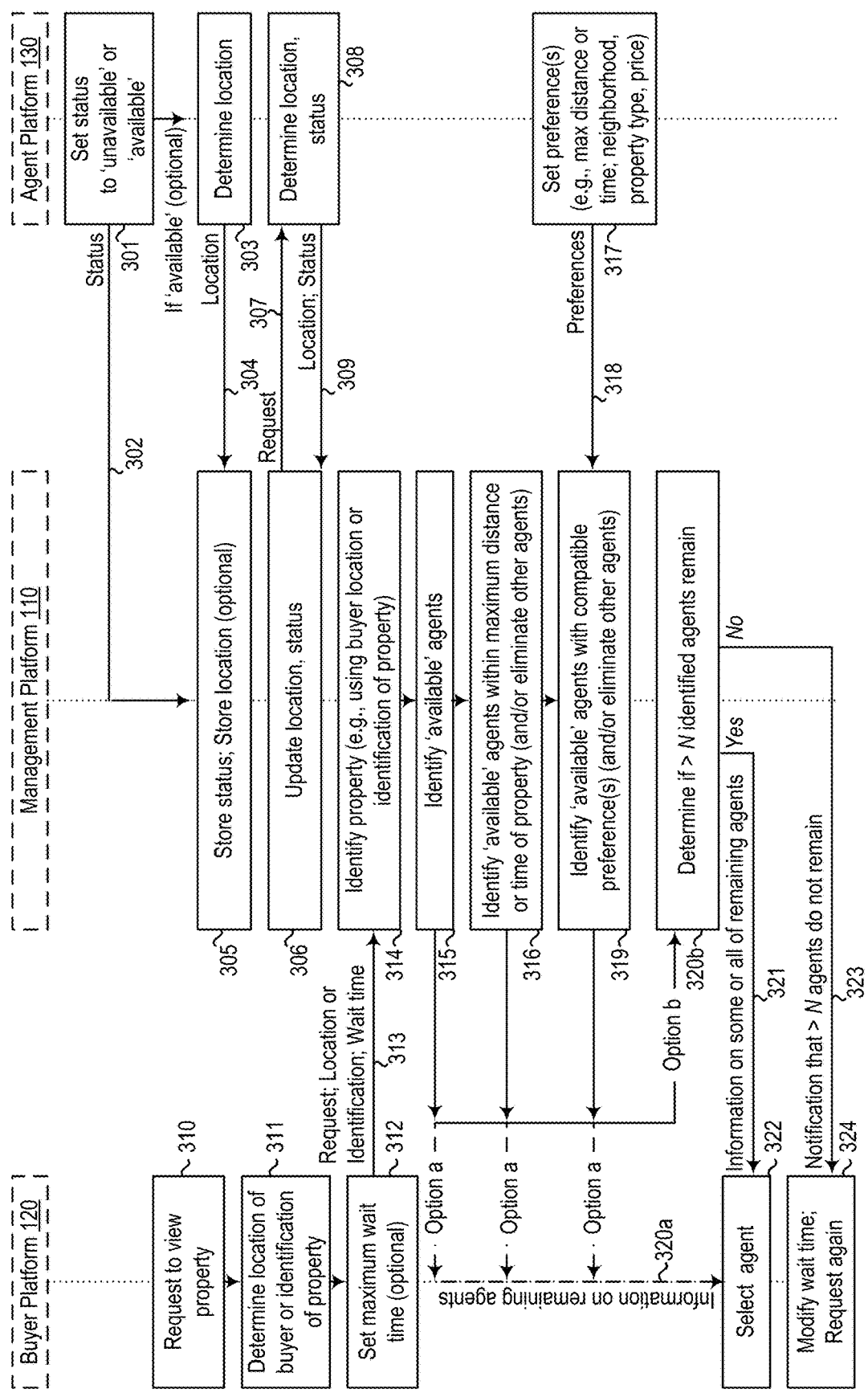
FIG. 3 illustrates a process for connecting nearby real estate agents with potential buyers in accordance with aspects of the disclosure.

Attention is now drawn to FIG. 3, which illustrates a process for connecting real estate agents with potential buyers in accordance with aspects of the disclosure. For simplicity, FIG. 3 illustrates the process using one buyer platform 120 and only one agent platform 130. It is to be understood that additional platforms 120 and 130 are contemplated, where each platform carries out the operations shown in FIG. 3.

As shown in FIG. 3, an agent uses an agent platform 130 to set the agent's status as 'unavailable' or 'available' (301). The status is transmitted to the management platform 110 (302), and the management platform 110 stores the status (305). Different embodiments are contemplated where the agent sets any type of status, including statuses that may not identify availability of that agent.

The location of the agent is also determined (303), transmitted to the management platform 110 (304), and stored at the management platform 110 (305). In one embodiment, the location may be determined, transmitted and stored only when the agent's status is at a particular setting (e.g., 'available'). In another embodiment, the location may be determined, transmitted and stored when the agent's status is at any of the settings.

Different approaches for determining an agent's location are contemplated. For example, the location may be determined using agent input (e.g., input from the agent that specifies an address or other identifier of the agent's location). The location may be determined using location technologies (e.g., trilateration or other location technologies that use a satellite and/or a terrestrial beacon network). The location may be determined using other approaches known or later-developed by one of skill in the art.

In some embodiments, as illustrated by FIG. 3, the management platform 110 updates the agent's location and status (306) by transmitting a request for the agent's location or status (307), after which the agent platform 130 determines the location and status (308) before transmitting an updated status and/or location (or an indication that no update is necessary) to the management platform 110 (309). Of course, the agent platform 130 may transmit updates without receiving any request from the management platform 110. In some embodiments, the management platform 110 (or an application running on the agent platform 130) may request an agent to confirm his or her 'available' status, and then wait for such confirmation during a predefined period of time, after which the agent's status is set to 'unavailable' if the agent does not confirm the 'available' status.

FIG. 3 also illustrates operations associated with a buyer. As shown, a buyer initiates a request of view a real estate property (310) via the buyer platform 120. An identity or a location of the property is also determined or estimated (311).

The request may occur before or after the property is identified. In one embodiment, the request may occur when the buyer is not located near the property. In another embodiment, the request may occur when the buyer is located near the property such that the property is identified by the location of the buyer platform 120, or by an identity of the property (e.g., an address, zip code, street or other information inputted by the buyer, or another identifier captured by scanning a code, detecting a signal transmitted from a network associated with the property, or by other means).

A maximum wait time, which specifies how long the buyer is willing to wait for an agent to arrive at the property, may optionally be set by the buyer (312). The request to view the property, the location or identity of the property, and the maximum wait time may be transmitted to the management platform 110 (313), and the management platform 110 may identify the property (314).

In one embodiment, the property is identified by the management platform 110 using an estimated location of the buyer platform 120 when it is known that the buyer is near the property. Different approaches for determining the location of a buyer are contemplated, including those approaches described above in relation to agents.

In another embodiment, the property is identified using other information received from the buyer platform 120, including an identifier associated with a code that is scanned into the buyer platform 120 (e.g., a code scanned from a flyer or sign), or an identifier that is transmitted from a transmitter positioned at the property and received by a receiver of the buyer platform 120 (e.g., a local area network beacon).

In yet another embodiment (not shown in FIG. 3), instead of transmitting information through the network connection of the buyer platform 120 (e.g., an RF communication pathway of a cell phone), the information may be transmitted to the management platform 110 through a network hosted by the property (e.g., via the Internet through a cable connection of the property platform 140 of FIG. 1B).

Once the property is identified (314), available agents are identified or eliminated from consideration. Various embodiments for identifying available agents are contemplated. In one embodiment, all available agents are identified (315). In other embodiments, only some available agents are identified, as described below.

In one embodiment, available agents within a maximum distance from the property are identified (316), where the maximum distance is set to a default amount of distance or set to an amount of distance selected by the buyer. Alternatively, available agents within a maximum amount of travel time form the property may be identified (316). The maximum travel time may be set to a default amount, or may be set to the wait time set by the buyer (see 312). An agent's travel time to the property may be determined using known or later-developed navigation technologies that estimate the time needed to complete a trip from that agent's current location to the location of the property using knowledge of the travel pathways (e.g., roads), and sometimes using current conditions of those travel pathways.

In another embodiment, agents set preferences (317) that are transmitted to the management platform 110 (318), and then later used to identify available agents (319). For example, an agent may set a maximum distance or time that the agent is willing to travel to reach a property. The agent may set neighborhoods within which that agent is willing to show or not show properties. Similarly, the agent may set a minimum or maximum listing price of property that the agent is willing or not willing to show, or may set restrictions on the type of property or characteristics of the property that the agent is willing or not willing to show. These preferences may be compared to the location of the property and/or other characteristics of the property (e.g., the listing price, the neighborhood, the type, and the like) to identify agents who are compatible with the identified property (319).

Once agents are identified (315, 316, 319), information about those identified agents may be transmitted to the buyer platform 120 (320*a*). Information about the agents may include: Agent Name; Agent photo; Agent contact info, including email, phone number, and the like; Affiliated brokerage; Feedback from previous clients, including ratings and comments; Biographical information populated by the agent or aggregated from external sources; Sales history, including number of homes sold in this neighborhood; Showing history, including number of homes shown in this neighborhood; Travel distance to the listing, as of a time (e.g., the current time); Number of years of experience; Information about areas of particular expertise (including neighborhoods and types of sales, such as multifamily property, and the like); Social media or other web-accessible profiles or personal pages; and other information known or later developed in the art.

The buyer may the select an agent (322); however, before selection of the agent, the buyer may review, filter or otherwise use the information about the agents.

Alternatively, the management platform 110 may determine if a minimum number N of available agents has been identified (320*b*). If yes, information about those agents is transmitted to the buyer platform 120 (321), and the buyer may then select an agent (322). If no, a notification is sent from the management platform 110 to the buyer platform 120 (323). The notification may indicate that no agents are available, that no agents are located within the maximum distance or travel time, or that not enough agents are available. The buyer may then modify his or her wait time, or make another request at a later time (324).

Figure 4:
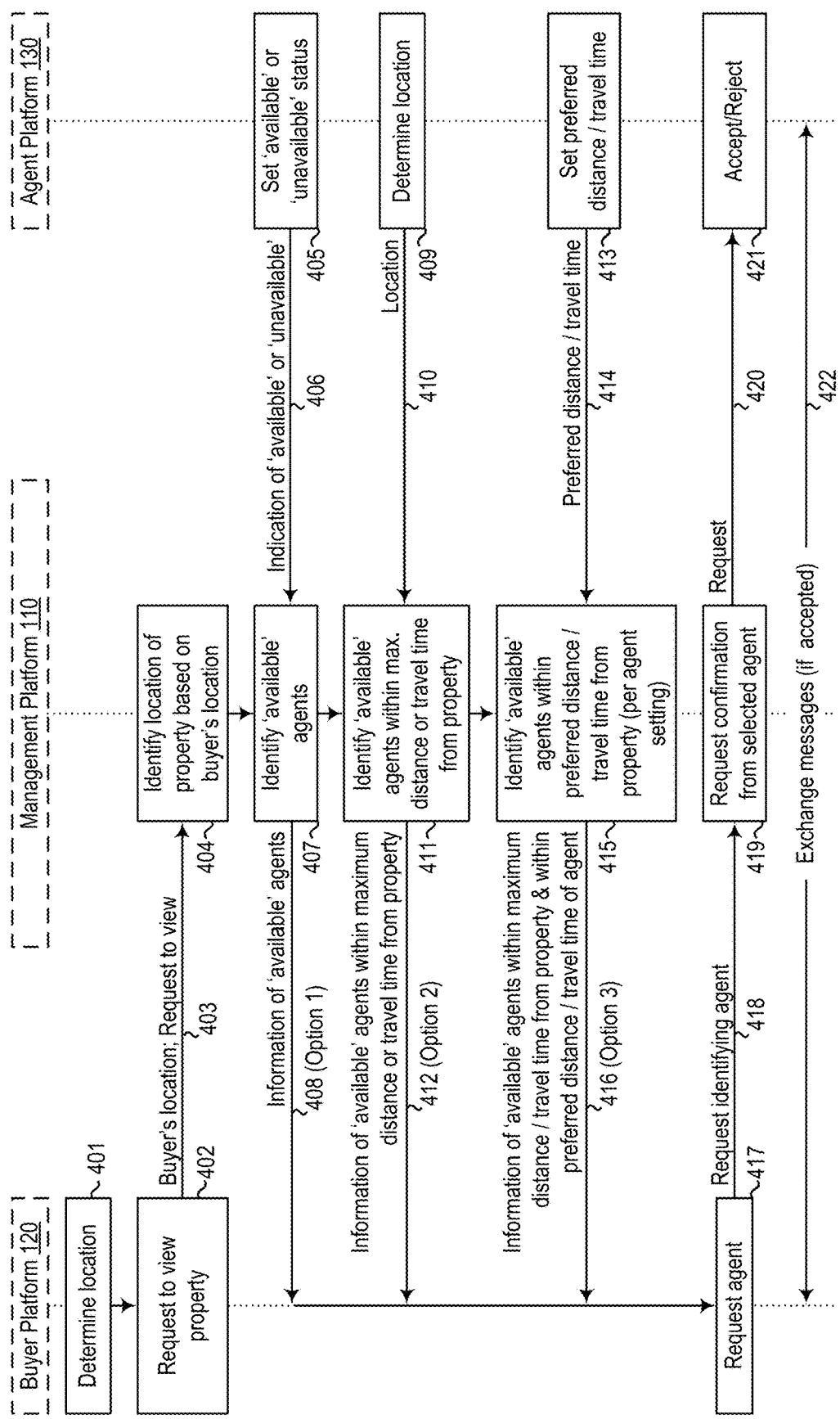
FIG. 4 illustrates another process for connecting nearby real estate agents with potential buyers in accordance with aspects of the disclosure.

FIG. 4 illustrates another process for connecting real estate agents with potential buyers. For purposes of illustration, it is assumed that a buyer has stopped at a property, and is interested in viewing the property.

As shown in FIG. 4, the location of the buyer platform 120 is estimated (401), and the buyer makes a request to view the property (402). Information related to the estimated location and the request is transmitted to the management platform 110 (403). The management platform 110 identifies the property based on the estimated location (404). For example, a latitude and longitude of the estimated location may be correlated to a latitude and longitude of available properties. As previously mentioned, there are other ways to identify the property, including input from the buyer that identifies the property (e.g., an address), and information captured by the buyer platform 120 (e.g., a scanned code or data exchanged between the property platform 140 and the buyer platform 120).

The management platform 110 may also send a list of nearby properties so that the buyer may select the property of interest from among the list of nearby properties.

FIG. 4 also shows that agents may set their statuses (405), and data representing each status may be transmitted to the management platform 110 (406).

After receiving the buyer's request and identifying the property (404), the management platform 110 may identify available agents (407) and then transmit information about those 'available' agents to the buyer platform 120 (408).

Alternatively, the agent's location may be determined (409), and that agent's platform 130 may transmit the location to the management platform 110 (410). The management platform 110 may use both of the location of each agent and the location of the property to identify available agents that are within a maximum distance or a maximum travel time from the property (411), and may then transmit information about those available agents to the buyer platform 120 (412).

Alternatively, each agent may set a preferred amount of distance or time that the agent is willing to travel from his or her current location to a property (413), and that agent's platform 130 may transmit the preferred distance or time to the management platform 110 (414). The management platform 110 may use both of the preferences of each agent and the location of the property to identify available agents that are within their preferred distance or travel time from the property (415), and may then transmit information about those available agents to the buyer platform 120 (416).

After receiving information about available agents, the buyer may select an agent (417), and the buyer platform 120 may transmit a request to connect with that selected agent to the management platform (418). The management platform 110 may then generate a message for the selected agent to accept or reject the buyer's request to connect (419), and then transmit that message (420). The selected agent may then accept or reject the request (421). If the agent accepts, the buyer and agent may exchange messages (422). If the agent rejects (or is non-responsive), the buyer is notified and allowed to select another agent, at which point operations 417-421 are repeated.

Although not shown, the operations designated by 418-421 may be skipped to allow the buyer to simply exchange messages with a selected agent (422). Exchange of messages may occur thorough the management platform 110 (e.g., via a messaging application), or through other networks (e.g., SMS, email, chat, phone call, and the like).

In some embodiments, a buyer generates profile information that is accessed by agents before they accept or reject a request from the buyer. The profile information may include, among other things, a picture of the buyer and identity verification information. Verification information may include: Target price range; Mortgage pre-qualification information (including image of any pre-qualification letters); Social media or other web-accessible profiles or personal pages; Feedback from previous real estate agents who have worked with the buyer; Number of homes visited by the buyer; Number of homes purchased the management platform 110; Number of homes purchased during the lifetime of the buyer; Current purchasing preferences (e.g., type of home, areas of interest, type of purchase method, and the like); and other information known or later developed in the art.

The buyer may also be asked a series of qualifying questions prior to connecting that buyer with an agent to establish whether that buyer is working with another agent. The buyer may also upload or take a picture of their mortgage pre-qualification letter, which is then accessible to the agent.

The buyer is also prompted for feedback about what they liked and disliked about the property. The likes and dislikes can be captured using various approaches (e.g., via selection of interest levels for particular characteristics like a selection of 1 [disliked] to 5 [liked] in association with the layout or the property, the sizes of rooms, the quality of neighborhood, and the like). This information may be stored at the management platform 110. Additional information may also be stored, including the time of the viewing, the length of the viewing, and other information that is unique to the viewing. The management platform 110 may use the information inputted by the buyer to identify other properties with similar reactions from other buyers.

Buyers may access information about each agent, including ratings from other buyers, and the agent's experience with similar types of properties, the neighborhood, similar listing prices of properties and other historical information. After the buyer and agent meet for the viewing, the buyer agent may be prompted to provide feedback about the agent. This feedback is added to the real estate agent user's profile.

Buyers and agents may access information about the property, including characteristics of the listing (e.g., listing price, number and types and sizes of rooms, and the like). The buyer may also access information about previous viewings of the property to other buyers by different agents. Such information may include the number of previous showings (e.g., shown by statistics, a heat map or other illustration), the dates of previous showings, and ratings from the other buyers (e.g., what the other buyers liked and disliked about the property). The buyer may also access information about other properties viewed by the other buyers, and may filter the other properties to exclude properties viewed by some of the other buyers with likes and dislikes that are not similar to the likes and dislikes of the buyer.

The buyer can also choose to be contacted by a mortgage officer. If the buyer chooses to accept a contact from a mortgage professional, an application on the buyer's platform 120 will make a request to the management platform 110, which will check it's database of local mortgage officers, and then send contact information of the buyer to one or multiple local mortgage officers, or vice versa.

User Interfaces

FIG. 5A through FIG. 5F illustrate user interfaces provided by computer applications on one or more of the platforms shown in FIG. 1B. In particular, FIG. 5A through FIG. 5C depict user interfaces provided on an agent platform 130, and FIG. 5D through FIG. 5F depict user interfaces provided on a buyer platform 120.

FIG. 5A illustrates a user interface that allows an agent to set his or her status. FIG. 5B illustrates a user interface that allows an agent to accept or reject a request from a buyer to connect with that agent. FIG. 5C illustrates a user interface that allows an agent to view information about the property or contact the buyer. When the "Begin Showing" button is selected by the agent, data about the showing appointment begins logging. The duration of the showing appointment is recorded until the agent selects an "End Showing" button on another interface (not shown). During the showing (e.g., after the agent presses the "Begin Showing" button), buyers and agents will have access to tools and useful information such as: Note taking interface to record observations during the showing; Data about the local area such as demographics, nearby points of interest, previous real estate sales may also be accessible during this time; and other information known or later developed in the art.

FIG. 5D illustrates a user interface that allows a buyer to view information about a property, view available agents, or request a viewing of the property (which may also lead to a list of available agents). FIG. 5E illustrates a user interface that allows a buyer to view a list of agents. FIG. 5F illustrates a user interface that allows a buyer to view details about a particular agent, and to make a request that the agent meet the buyer at the property.

Other Aspects Related to Systems & Methods

Functionality and operation disclosed herein may be embodied as one or more methods implemented by machine(s) (e.g., processor(s)) at one or more locations. Non-transitory machine-readable media embodying program instructions adapted to be executed to implement the method(s) are also contemplated.

By way of example, not by way of limitation, method(s) may: identify a set of available agents from a plurality of agents; identify a location of each available agent; identify a buyer's request to view a real estate property; identify a location of the property; and cause information corresponding to one or more available agents in the set of available agents to be transmitted to a computing device associated with the buyer.

In accordance with some aspects, the plurality of agents include unavailable agents in addition to the available agents.

In accordance with some aspects, at least one of the available agents' locations is identified without input from the available agent associated with that location.

In accordance with some aspects, at least one of the available agents' locations is identified using input from the available agent associated with that available agent location.

In accordance with some aspects, the location of the property is identified using a position of the buyer.

In accordance with some aspects, the location of the property is identified by comparing the position of the buyer to the address of the property.

In accordance with some aspects, the location of the property is identified after a receiver at the property detects a signal from the computing device associated with the buyer.

In accordance with some aspects, the location of the property is identified after the computing device associated with the buyer detects a signal from a transmitter at the property.

In accordance with some aspects, the one or more available agents consist of a subset of available agents, from the set of available agents, with locations that are within a maximum distance from or maximum travel time to the location of the property.

In accordance with some aspects, the one or more available agents consist of a group of the available agents, from the set of available agents, that are closest to the location of the property in terms of distance or travel time relative to other available agents in the set of available agents.

In accordance with some aspects, the method comprises: choose not to transmit information corresponding to each of the other available agents.

The method may choose not to transmit information corresponding to each unavailable agent.

In accordance with some aspects, the information corresponding to each of the one or more available agents and the unavailable agents includes name and contact information for each respective agent.

In accordance with some aspects, the information corresponding to each of the one or more available agents and the unavailable agents includes an estimated time until each respective agent can arrive at the property.

In accordance with some aspects, the information corresponding to each of the one or more available agents and the unavailable agents includes an estimated distance between each respective agent and the location of the property.

Methods may: identify a subset of available agents, from the set of available agents, with locations that are within a maximum distance or a maximum travel time from the location of the property.

In accordance with some aspects, the maximum distance or the maximum travel time is based on a maximum amount of time the buyer is willing to wait until meeting with one of the available agents.

In accordance with some aspects, available agents from the set of available agents with locations that are not within the maximum distance or the maximum travel time from the location of the property are not included in the subset of available agents.

Methods may: for each of the available agents in the subset of available agents, determine if a distance or travel time between the location of that available agent and the location of the property exceeds a distance or travel time setting associated with that available agent.

Methods may: choose not to transmit information corresponding to each of the available agents in the subset of available agents that is associated with one of the respective distance or travel time settings that is exceeded by the distance or travel time between the location of that available agent and the location of the property.

In accordance with some aspects, the set of available agents is identified based on an indication of availability received from computing devices of the real estate agents.

In accordance with some aspects, the indication of availability specifies that the agent is currently available.

In accordance with some aspects, the indication of availability specifies that the agent will be available within a specified period of time.

the method comprises: identify a time of day and a length of time during which the buyer and an available agent met at the property.

Methods may: identify a first set of one of more characteristics of the property that the buyer liked; and identify a second set of one of more characteristics of the property that the buyer disliked.

Methods may: use the first set and the second set of characteristics to identify an additional property based on information associated with the additional property.

Methods may: use the first set and the second set of characteristics to identify another buyer based on information associated with the other buyer.

Methods may: identify a selection, by the buyer, of a first agent from the one or more available agents; and after an indication of the selection is transmitted to the first agent, identify an acknowledgement, by the first agent, that the first agent is still available to meet the buyer at the property.

Methods may: cause a mortgage pre-qualification letter to be transmitted to a first agent selected by the buyer from the one or more available agents.

Methods may: cause a plurality of messages to be transmitted between the buyer and a first agent selected by the buyer from the one or more available agents.

Any portion of the functionality embodied in the method(s) above may be combined with any other portion of that functionality.

Systems that carry out functionality (e.g., embodied as methods) may include one or more devices, including transmitter(s) from which position information is sent, receiver(s) at which position information is received, processor(s)/server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of transmitters and a server in another country). Additionally, one or more computers may programmed to carry out various methods, and instructions stored on one or more machine-readable media may be executed by a processor to perform various methods.

The illustrative systems, methods, logical features, blocks, modules, components, circuits, and algorithm steps described herein may be implemented, performed, or otherwise controlled by suitable hardware known or later developed in the art, or by firmware or software executed by processor(s), or any combination of hardware, software and firmware.

Systems may include one or more devices or means that implement the functionality (e.g., embodied as methods) described herein. For example, such devices or means may include processor(s) that, when executing instructions, perform a portion or all of any method disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include, or be included within, a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and user device, and the like, may refer to devices that include a processor, or may be equivalent to the processor itself.

"Memory" may be accessible by a machine, such that the machine can read information from and/or write information to the memory. It is noted that a "machine" may include a computer, a processor, a controller, or other suitable device as known or later developed in the art. Memory may be integral with or separate from the machine. Instructions may reside in such memory (e.g., RAM, flash, ROM, EPROM, EEPROM, registers, disk storage), or any other form of storage medium. Memory may include a non-transitory machine-readable medium having machine-readable program code (e.g., instructions) embodied therein that is adapted to be executed to implement any number of the various methods, or variations of such methods, disclosed herein. Machine-readable media may be any available storage media, including non-volatile media (e.g., optical, magnetic, semiconductor). Machine-readable media may be any available storage media, including removable, non-removable, volatile, non-volatile media. Examples of machine-readable media include an electric circuit, a semiconductor storage media (e.g., a semiconductor memory device), a ROM, a flash memory, an erasable ROM (EROM), a floppy diskette or other magnetic storage, a CD-ROM/DVD or other optical storage, a hard disk, or any other medium which can be used to store the desired information and which can be accessed. Carrier waves may be used to transfer data and instructions through electronic, optical, air, electromagnetic, RF, or other signaling media over a network using network transfer protocols. Instructions embodied in software can be downloaded to reside on and operated from different platforms used by known operating systems. Instructions embodied in firmware can be contained in an integrated circuit or other suitable device Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof.

Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

Transmission of information may be carried out using technologies, protocols, procedures and the like that are known or later-developed by one of skill in the art. For example, information may be represented by data, and that data may be transmitted over any communication pathway using any protocol, and then stored by any data source. A data source which is depicted as a single storage device may be realized by multiple (e.g., distributed) storage devices. A data source may include one or more types of data sources, including hierarchical, network, relational, non-relational, object-oriented, or another type of data source. As used herein, machine-readable media includes all forms of machine-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

The invention claimed is:

1. A computer based method for pairing an available agent with a potential buyer of a real estate property, wherein the method comprises:

receiving by a first computer a request from a computing device associated with the potential buyer to be connected with an agent to view the real estate property;

using the first computer, identifying an available agent from a set containing a plurality of agents, wherein the set containing the plurality of agents is stored in a memory associated with the first computer;

using the first computer, accessing over a web-based connection from an external computer, personal information associated with the potential buyer;

providing by the first computer the personal information to the available agent for display on a device of the available agent;

receiving by the first computer from the device of the available agent, an indication of an acceptance or a rejection of the potential buyer by the available agent; and using the first computer, identifying a first set of one of more characteristics of the real estate property that the potential buyer liked; identifying a second set of one of more characteristics of the real estate property that the potential buyer disliked; and using the first set and the second set of characteristics to identify an additional property based on information associated with the additional property, or identifying another buyer based on information associated with the another buyer.

2. The method of claim 1, wherein the set containing the plurality of agents includes unavailable agents in addition to available agents, and wherein the request by the potential buyer includes a location of the real estate property.

3. The method of claim 1, wherein a location of the available agent is determined by the first computer based at least in part on information received from the device of the available agent based on a satellite location system.

4. The method of claim 1, wherein a location of the available agent is determined by the first computer based at least in part on information received from the device of the available agent using information input into the device by the available agent.

5. The method of claim 1, wherein a location of the real estate property is identified by comparing a position of the potential buyer to the address of the real estate property, or wherein the location of the real estate property is identified after a receiver at the real estate property detects a signal from the computing device associated with the potential buyer, or wherein the location of the real estate property is identified after the computing device associated with the potential buyer detects a signal from a transmitter at the real estate property.

6. The method of claim 1, further comprising determining a subset of available agents, from the set of the plurality of agents, based on locations of agents that are within a maximum distance from or maximum travel time to the location of the property.

7. The method of claim 6, further comprising transmitting information related to the potential buyer to each agent of the subset of available agents.

8. The method of claim 6, wherein the method comprises: for each agent in the subset of available agents, determining if a distance or travel time between the location of that agent and the location of the property exceeds a distance or travel time setting associated with that agent.

9. The method of claim 8, wherein the method comprises: choosing not to transmit information corresponding to each one of the agents in the subset of available agents that is associated with one of the respective distance or travel time settings that is exceeded by the distance or travel time between the location of that available agent and the location of the property.

10. The method of claim 1, wherein the method comprises: choosing not to transmit information corresponding to each unavailable agent.

11. The method of claim 1, further comprising obtaining information corresponding to each one of the plurality of agents including name and contact information for each respective agent, and an estimated time until each respective agent can arrive at the property.

12. The method of claim 1, wherein the method comprises: identifying a subset of available agents with locations that are within a maximum distance or a maximum travel time from the location of the property.

13. The method of claim 12, wherein the maximum distance or the maximum travel time is based on a maximum amount of time the potential buyer is willing to wait until meeting with an available agents.

14. The method of claim 1, wherein the available agents is identified based at least in part on an indication of availability received from the computing device of the available agent.

15. The method of claim 14, wherein the indication of availability specifies that the available agent is currently available, and wherein the indication of availability specifies that the available agent will be available for a specified period of time.

16. The method of claim 1, wherein the method comprises: identifying a time of day and a length of time during which the potential buyer and an available agent met at the property.

17. The method of claim 1, wherein the method comprises:
    identifying a selection, by the potential buyer, of a first agent from one or more available agents; and
    after an indication of the selection is transmitted to the first agent, identifying an acknowledgement, by the first agent, that the first agent is still available to meet the potential buyer at the property.

18. The method of claim 1, wherein the method comprises: causing a mortgage pre-qualification letter to be transmitted to a first agent selected by the potential buyer.

19. The method of claim 1, wherein the method comprises: causing a plurality of messages to be transmitted between the potential buyer and a first agent selected by the buyer.

* * * * *